United States Patent [19]

Riegler et al.

[11] 3,897,121
[45] July 29, 1975

[54] TILTABLE CONVERTER SELF-ALIGNING BEARING

[75] Inventors: Ernst Riegler, Enns; Manfred Schmidt, Linz, both of Austria

[73] Assignee: Vereinigte Osterreichische Eisen- und Stahlwerke - Alpine Montan Aktiengesellschaft, Linz, Austria

[22] Filed: Oct. 31, 1973

[21] Appl. No.: 411,428

[30] Foreign Application Priority Data
Jan. 30, 1973  Austria .............................. 776/73

[52] U.S. Cl. .................. 308/36.1; 308/72; 308/78; 308/121
[51] Int. Cl. ...... F16c 1/24; F16c 23/04; F16c 33/72
[58] Field of Search .............. 308/9, 15, 36.1, 36.3, 308/72, 73, 77, 78, 121

[56] References Cited
UNITED STATES PATENTS
| | | | |
|---|---|---|---|
| 2,149,712 | 3/1939 | Wallgren | 308/73 |
| 2,932,542 | 4/1960 | Smith | 308/9 |
| 3,427,081 | 2/1969 | Dellinger | 308/15 |

FOREIGN PATENTS OR APPLICATIONS
| | | | |
|---|---|---|---|
| 293,808 | 10/1971 | Austria | 308/36.1 |
| 1,250,399 | 10/1971 | United Kingdom | 308/36.1 |

*Primary Examiner*—M. Henson Wood, Jr.
*Assistant Examiner*—Howard Beltran
*Attorney, Agent, or Firm*—Brumbaugh, Graves, Donohue & Raymond

[57] ABSTRACT

A bearing construction or assembly for a trunnion of a tiltable converter, said bearing assembly comprising a bearing capable of absorbing angular (sagging) and drunken (wobbling) movements, spacer rings for fixing said bearing in position and a housing with sealing means surrounding said bearing. The construction or assembly is further provided with two sleeves arranged in recesses of the spacer rings with play and surrounding them at a distance. The sleeves are provided with at least one flange-like stud which projects into the interior of the bearing and engages a corresponding recess in the spacer rings with play. The lateral faces of the stud and of the recess are designed as spherical faces whose common central point coincides with the central point of the bearing. The space between the sleeves and the spacer rings is filled with lubricating grease.

5 Claims, 3 Drawing Figures

TILTABLE CONVERTER SELF-ALIGNING BEARING

The invention relates to a bearing assembly for a tiltable converter, the bearing assembly including a bearing capable of absorbing angular (sagging) and drunken (wobbling movements, fixed in position by means of spacer rings which are secured to the carrying trunnion of the converter, and surrounded by a housing with a sealing means. It should be noted that in the specification and in the appended claims, the term bearing is meant to refer to slide-articulation bearings or to roller bearings.

Converter bearings, which accommodate carrying loads of more than 1000 mt (metrictons), are exposed to the influences of heat and dust and must absorb drunken movements when the carrying trunnions are in oblique positions, must be constructed with great care, in particular with regard to sealing the inner space of the bearing against the intrusion of foreign bodies.

According to Austrian Pat. No. 293 808, a trunnion seal has become known which is composed of a sealing line inserted into a groove surrounding the trunnion. The groove is formed of two section rings which may be drawn towards each other in axial direction, and these section rings together with the sealing line are radially displaceable within an annular recess of the bearing housing or a bearing cover, respectively, so that even when the carrying trunnion makes a drunken (wobbling) movement, the sealing effect is maintained. Although the considerations were correct on which this construction is based, operational practice has shown that the life of the sealing is insufficient. When the trunnion is positioned obliquely, the sealing line is greatly distorted owing to the radial sliding movement in the bearing housing. The sealing material is stressed thereby to more than its elastic limit so that its elastical properties gradually are lost. In the course of time, the bearing inner space will then be "opened up" so that entering dirt, solid slag, iron or other particles will damage the bearing soon and the converter operation has to be interrupted. The exchange of a heavy converter bearing is extremely expensive.

The invention is aimed at avoiding these disadvantages and difficulties and at creating a bearing construction in which no plastic material or rubber sealings need be used, i.e., to attempt a sealing which continues to function satisfactorily when the carrying trunnion performs angular or drunken movements.

In a bearing construction or assembly of the kind defined in the introduction this task is solved in that between the bearing housing and the spacer rings, two sleeves are arranged in recesses of the spacer rings with play to surround them at a distance. The sleeves are provided with at least one flange-like stud projecting into the interior and engaging a corresponding recess of the spacer rings with play, the side faces of the flange-like stud and of the corresponding recess being designed as spherical faces with a common central point lying in the center of the bearing. The spaces between the sleeves with the studs and the spacer rings with the recesses are filled with a pasty sealing agent, e.g., bearing lubricating grease.

Suitably the sleeves are formed as one (integral) part with the lateral housing parts.

Advantageously a channel for supplying the pasty sealing agent ends at the inner wall of the sleeves.

In order that the invention may be more fully understood, an embodiment thereof shall now be described with reference to the accompanying drawings.

Figure 1:
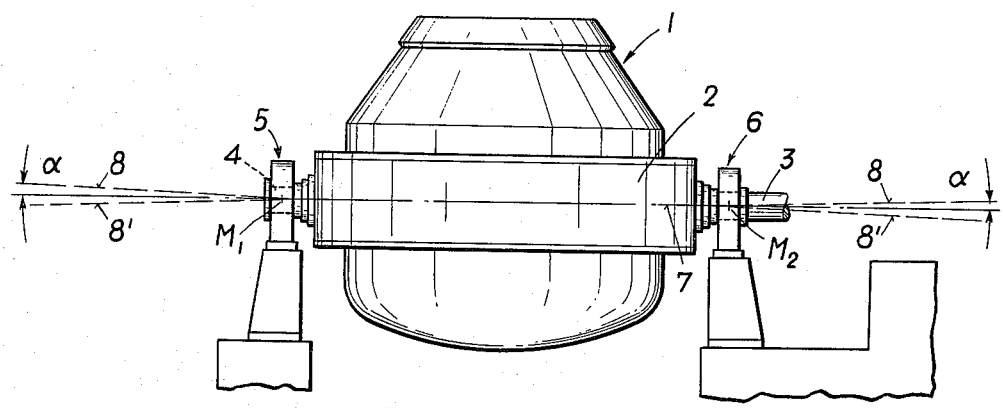
FIG. 1 shows a total side view of a converter with its bearings.

In FIG. 1, numeral 1 denotes a converter which is surrounded by a carrying ring 2 and tiltably supported by means of the carrying trunnions 3,4 in a movable bearing 5 and a fixed bearing 6. $M_1$ and $M_2$ denote the central points of the movable bearing 5 and the fixed bearing 6 through which also the carrying trunnion axis 7 is laid. Owing to thermal influences, the carrying trunnions 3,4 may be positioned obliquely. Such obliquely positioned axes are denoted with 8 or 8', respectively, whereby the deviation $\alpha$ from the axis 7 amounts to about $\pm 1°$.

Figure 2:
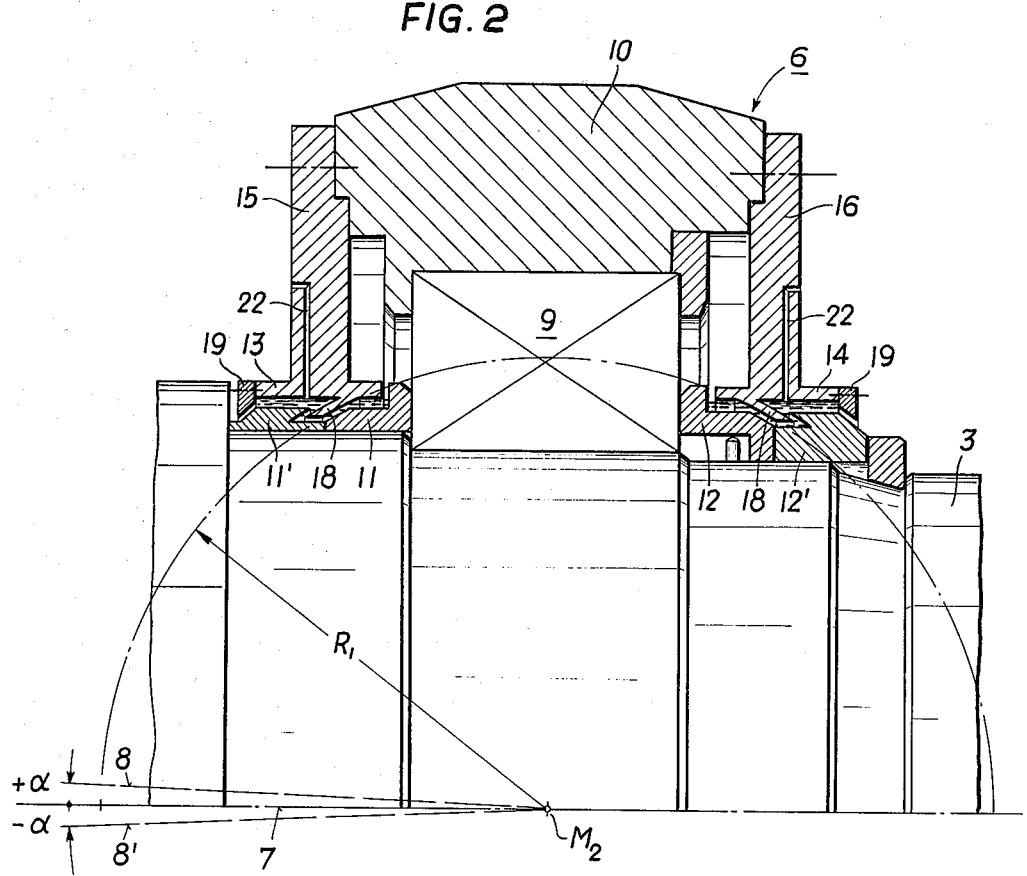
FIG. 2 is a longitudinal sectional view of the upper part of the bearing according to the invention.
Figure 3:
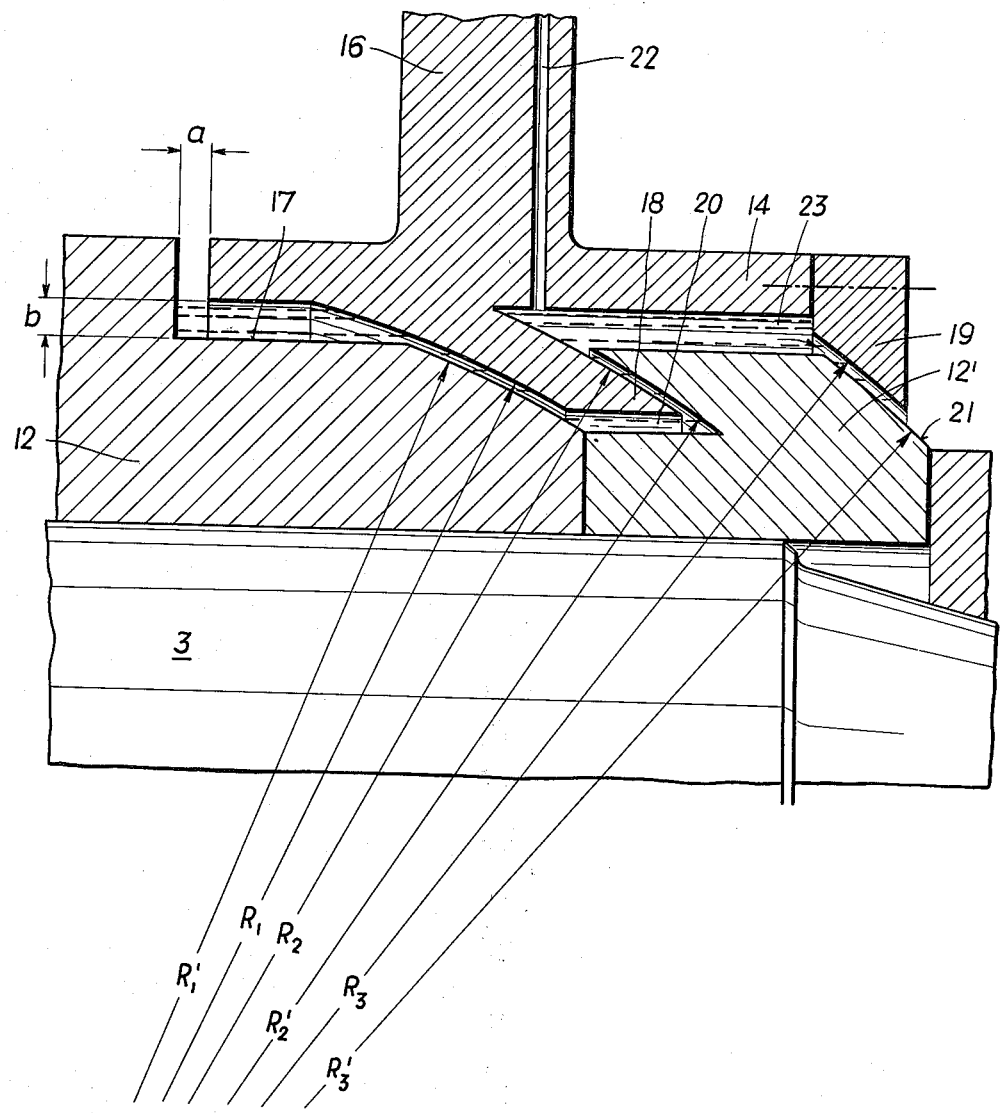
FIG. 3 illustrates a detail of FIG. 2 in enlarged scale.

In order to avoid any leakage in the fixed bearing 6 when the carrying trunnion 3 is placed obliquely by the angle $\pm \alpha$, i.e., during a drunken movement, a bearing construction is used which is shown in a simplified manner in FIGS. 2 and 3.

The fixed bearing 6 essentially comprises a slide-articulation or roller bearing 9, which is surrounded by a housing cover 10 which is releasably connected with the bearing foot, not shown. The bearing 9 is fixed in position by two spacer rings 11,11' and 12,12' which are made of two parts. These spacer rings are secured to the carrying trunnion 3 on both sides of the slide-articulation or roller bearing. The spacer rings are made of two parts so that they may more easily and more simply be manufactured and mounted. Numerals 13,14 denote sleeves surrounding each spacer ring 11,11' and 12,12' and secured to housing covers 15 and 16. As illustrated in FIG. 2 the sleeves 13,14 may form integral structural parts with the housing covers 15,16. The housing covers 15,16 are secured laterally to the housing cover 10.

As may be derived in detail from FIG. 3, the cover part 16 or the sleeve 14, respectively, is inserted in a recess 17 of the spacer ring 12,12' with a lateral play $a$ and a radial distance $b$. The sleeve is provided with flange-shaped studs 18,19 whose lateral faces are designed as spherical faces with the radii $R_1$, $R_2$, $R_3$ whose common central point lies in the center $M_2$ of the bearing 9. These flange-shaped studs 18,19 extend into corresponding recesses 20,21 of the spacer ring 12,12' whose lateral faces are also designed as spherical faces with the radii $R_1'$, $R_2'$, $R_3'$ whose common central point lies in the center $M_2$ of the bearing 9. The cover part 15 and the sleeve 13 on the other side of the bearing are formed in the same way; they likewise have flange-shaped studs 18,19 which extend into corresponding recesses of the spacer rings 11,11' and are provided with spherical faces, whose center coincides with the central point $M_2$ of the bearing. Since $R_1$ is somewhat greater than $R_1'$, or since $R_2$ is somewhat greater than $R_2'$, or since $R_3$ is somewhat greater than $R_3'$, small plays are obtained. Accordingly in each angular movement by the angle $\pm \alpha$, the trunnion 3 with its spacer rings 11,11' and 12,12' may be displaced relative to the sleeves 13,14, whereby corresponding to the magnitude of $\alpha$, the play $a$ or the distance $b$, respectively, has such a dimension that a contact between the spacer rings 11,11' or 12,12' and the sleeves 13,14 is avoided.

Numeral 22 denotes a supply channel for a pasty sealing agent, e.g., bearing lubricating grease, which ends in the inner wall of the sleeve 14, so that the bearing lubricating grease may be supplied into the space 23 between the spacer ring 12,12' and the sleeve 14. The bearing lubricating grease is supplied in direction of the arrow into the bearing interior, on the one hand, and against the direction in which dirt and other solid bodies might enter, on the other hand. By this arrangement of the flange-shaped studs, which, as described, extend with small play into recesses, a labyrinth gland is formed whose sealing effect is maintained completely intact even when the carrying trunnion 3 carries out a drunken movement. The lubricating grease cushion is merely displaced or pushed in one direction or the other, so that the emerging lubricating grease has to be replenished from time to time. In order to make sure that always a sufficient amount of lubricating grease is present, the distance $b$ should be kept as large as possible. $b$ should thus be greater than $a$. The labyrinth sealing means prevents an intrusion of solid particles into the bearing interior even if the space 23 should only partly be filled with lubricating grease. Hence, it follows that the bearing functions also under extreme operational conditions.

In principle, the invention as described is applicable also for a movable bearing, i.e., for a carrying trunnion bearing 5 according to FIG. 1, in which the slide-articulation or roller bearing is axially displaceable within the bearing housing by means of a slide bushing. In this case, the sleeves 13,14 are designed as independent structural parts which are axially displaceable relative to the housing covers 15,16 and in between sealings of plastic material or rubber are provided.

What we claim is:

1. A bearing assembly for supporting a carrying trunnion of a tiltable converter comprising:
   a. bearing for journaling a carrying trunnion and being adapted to accommodate angular and wobbling movements of the trunnion;
   b. a bearing housing enclosing the bearing and including (i) two annular, radially inwardly depending flange portions located at different ends of the housing and (ii) sealing means including an annular, axially extending sleeve portion located at a radially inward end of each flange portion of the housing;
   c. at least one spacer ring located adjacent each end of the bearing, the spacer rings being adapted to encircle a carrying trunnion and to be secured on the trunnion so as to fix the bearing in position axially of the trunnion, a recess being formed in the radially outer periphery of said at least one spacer ring at each end of the bearing to extend axially and circumferentially of said spacer ring and a sleeve portion of the housing being received in each recess, the sleeve portions and the recesses being dimensioned and located such that the sleeve portions are adapted to be spaced both radially and axially of adjacent surfaces of the spacer rings; and
   d. a pasty sealing agent filling spaces between the sleeve portions and the spacer rings;
   each sleeve portion having at least one flange projecting radially inwardly of the sleeve portion and the recesses of the spacer rings being correspondingly configured to receive the flanges of the sleeve portions so that said flanges are spaced from adjacent surfaces of the spacer rings, at least one flange on each sleeve portion being located between opposite ends of the sleeve portion, radially extending lateral surfaces of the flanges of the sleeve portions and adjacent radially extending surfaces of the spacer rings having spherical configurations all generated from a common center point located adjacent the center of the bearing.

2. A bearing assembly according to claim 1, wherein the pasty sealing agent is bearing lubricating grease.

3. A bearing assembly according to claim 1, wherein the sleeve portions of the housing are each formed in one piece with an adjacent flange portion of the housing.

4. A bearing assembly according to claim 1, wherein a channel is formed in each sleeve portion for supplying pasty sealing agent to a space between the sleeve portion and the spacer ring, the channel opening into said space at a radially inner peripheral surface of the sleeve portion.

5. A bearing assembly for supporting a carrying trunnion of a tiltable converter comprising:
   a. a bearing for journaling a carrying trunnion and adapted to accommodate angular and wobbling movements of the trunnion;
   b. a housing enclosing the bearing and including (i) two annular, radially inwardly depending flange portions located at different ends of the housing, and (ii) an annular, axially extending sleeve portion located at a radially inward end of each flange portion of the housing; and
   c. at least one spacer ring located adjacent each end of the bearing, the spacer rings being adapted to encircle a carrying trunnion and to be secured on the trunnion so as to fix the bearing in position axially of the trunnion, at each end of the bearing at least one spacer ring having formed in its radially outer periphery a recess extending axially and circumferentially of the spacer ring and a sleeve portion of the housing being received in each recess, the sleeve portions and the recesses being dimensioned and located such that the sleeve portions are adapted to be spaced both radially and axially of adjacent surfaces of the spacer rings, spaces between the sleeve portions and the spacer rings being adapted to receive a sealing and lubricating medium,
   each sleeve portion of the housing having at least one flange projecting radially inwardly of the sleeve portion and the recesses of the spacer rings being correspondingly configured to receive the flanges of the sleeve portions so that said flanges are spaced from adjacent surfaces of the spacer rings, at least one flange on each sleeve portion being located between opposite ends of the sleeve portion, radially extending lateral surfaces of the flanges of the sleeve portions and adjacent radially extending surfaces of the spacer rings having spherical configurations all generated from a common center point located adjacent the center of the bearing.

* * * * *